(12) United States Patent
Zhang et al.

(10) Patent No.: US 10,715,428 B2
(45) Date of Patent: Jul. 14, 2020

(54) RESOURCE RESERVATION TECHNIQUES FOR POINT-TO-MULTIPOINT TUNNELS ON A RING NETWORK

(71) Applicant: Juniper Networks, Inc., Sunnyvale, CA (US)

(72) Inventors: Zhaohui Zhang, Westford, MA (US); Abhishek Deshmukh, Wilmington, MA (US); Ravi Singh, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 11 days.

(21) Appl. No.: 16/018,708

(22) Filed: Jun. 26, 2018

(65) Prior Publication Data

US 2019/0394122 A1 Dec. 26, 2019

(51) Int. Cl.
*H04L 12/723* (2013.01)
*H04L 12/42* (2006.01)
*H04L 12/761* (2013.01)

(52) U.S. Cl.
CPC ............. *H04L 45/50* (2013.01); *H04L 12/42* (2013.01); *H04L 45/16* (2013.01)

(58) Field of Classification Search
CPC ....... H04L 45/50; H04L 45/507; H04L 45/22; H04L 45/02; H04L 45/16; H04L 45/00;
(Continued)

(56) References Cited

U.S. PATENT DOCUMENTS 7,990,993 B1   8/2011 Kaushik et al.
9,253,097 B1 * 2/2016 Barman ................ H04L 47/122
(Continued)

FOREIGN PATENT DOCUMENTS

CN    102571534 A   7/2012
EP      2809036 A1   3/2014

OTHER PUBLICATIONS

Aggarwal et al.; "Extensions to Resource Reservation Protocol—Traffic Engineering (RSVP_TE) for Point-to-Multipoint TE Label Switched Paths (LSPs);" Network Working Group; RCF 4875; May 2007; 50 pp. (Year: 2007).*

(Continued)

*Primary Examiner* — Marsha D Banks Harold
*Assistant Examiner* — Elton Williams
(74) *Attorney, Agent, or Firm* — Shumaker & Sieffert, P.A.

(57) ABSTRACT

Techniques are described for signaling a resource reservation point-to-multipoint (P2MP) label switched path (LSP) in a ring network. For example, the techniques include sending a single resource reservation request message without the ingress needing to send multiple resource reservation request messages, one for each leaf network device of the P2MP ring LSP. The resource reservation request message includes a leaf identification object from which network devices of a P2MP ring LSP may explicitly or implicitly identify themselves as prospective leaf network devices of the P2MP ring LSP. A network device determined to be a leaf network device may send a resource reservation response message back to the ingress network device of the P2MP ring LSP and send a modified resource reservation request message (if explicit) and/or the same resource reservation request message (if implicit) to a next hop network device along the P2MP ring LSP.

26 Claims, 5 Drawing Sheets

(58) Field of Classification Search
CPC ..... H04L 47/724; H04L 47/825; H04L 12/42; H04L 12/437; H04L 2001/0093
See application file for complete search history.

(56) References Cited

U.S. PATENT DOCUMENTS

| | | | |
|---|---|---|---|
| 9,413,605 B2 | 8/2016 | Kompella et al. | |
| 2003/0227919 A1* | 12/2003 | Zelig | H04L 12/42 370/392 |
| 2009/0268731 A1* | 10/2009 | Narayanan | H04L 12/18 370/390 |
| 2015/0381408 A1* | 12/2015 | Kompella | H04L 41/0668 370/222 |

OTHER PUBLICATIONS

Awduche et al. "RSVP-TE: Extensions to RSVP for LSP Tunnels", Network Working Group, RFC 3209, Dec. 2001, 61 pp.
Deshmukh et al. "RSVP Extensions for RMR" draft-deshmukh-mpls-rsvp-rmr-extension-01, Internet—Draft, Sep. 8, 2017, 15 pp.
Deshmukh et al. "RSVP Extensions for RMR" draft-deshmukh-teas-rsvp-rmr-extension-00, Internet—Draft, Feb. 13, 2018, 15 pp.
Kompella, K. "Resilient MPLS Rings" draft-ietf-mpls-rmr-07, Internet—Draft, Mar. 4, 2018, 14 pp.
Kompella, K. "Resilient MPLS Rings" draft-ietf-mpls-rmr-06, Internet—Draft, Jan. 3, 2018, 14 pp.
Extended Search Report from counterpart European Application No. 19180550.6, dated Oct. 9, 2019, 7 pp.
Deshmukh et al., "RSVP Extensions for RMR draft-ietf-teas-rsyp-rmr-extension-00," TEAS WG Internet Draft, Jun. 19, 2018, 15 pp.

\* cited by examiner

RESOURCE RESERVATION TECHNIQUES FOR POINT-TO-MULTIPOINT TUNNELS ON A RING NETWORK

TECHNICAL FIELD

The disclosure relates to computer networks and, more particularly, to engineering traffic flows within computer networks.

BACKGROUND

Routing devices within a network, often referred to as routers, maintain routing information that describes available routes through the network. Upon receiving an incoming packet, the router examines information within the packet and forwards the packet in accordance with the routing information. To maintain an accurate representation of the network, routers typically exchange routing information in accordance with one or more defined routing protocols, such as the Border Gateway Protocol (BGP).

Multi-Protocol Label Switching (MPLS) techniques may be used to engineer traffic patterns within Internet Protocol (IP) networks. Using MPLS, a source device can request a path through a network to a destination device, i.e., a Label Switched Path (LSP). An LSP defines a distinct path through the network to carry MPLS packets from the source device to a destination device. Each router along an LSP allocates a label and propagates the label to the closest upstream router along the path. Routers along the path cooperatively perform MPLS operations to forward the MPLS packets along the established path. A variety of protocols exist for establishing LSPs, such as the Label Distribution Protocol (LDP) and the Resource Reservation Protocol with Traffic Engineering extensions (RSVP-TE).

A plurality of routing devices within a network may be arranged as a ring network. In some examples, a ring network may operate as an access network to customer networks. That is, a ring network may operate to provide fast packet-based transport of communications between customer networks connected to the ring network, and/or provide the customer networks access to public network, such as the Internet or other provider networks.

SUMMARY

In general, techniques are described for signaling a resource reservation point-to-multipoint (P2MP) label switched path (LSP) in a ring network (referred to herein as "P2MP ring LSP"). For example, the techniques include signaling a P2MP ring LSP sending a single resource reservation request message without the ingress needing to send multiple resource reservation request messages, one for each leaf network device (otherwise referred to herein as "node") of the P2MP ring LSP. For example, a plurality of network devices, e.g., routers, in a ring network may establish a multicast P2MP LSP terminating at a plurality of egress routers (referred to herein as "leaf network devices" or "leaf nodes").

To signal the P2MP ring LSP, an ingress network device of the P2MP ring LSP may send a resource reservation request message (e.g., RSVP PATH message) including a leaf identification object (e.g., source-to-leaf (S2L) Sub-LSP Descriptor List) from which network devices of a P2MP ring LSP may explicitly or implicitly identify themselves as prospective leaf network devices of the P2MP ring LSP. For example, a network device may receive a leaf identification object and determine, based on the leaf identification object, whether the network device is one of the leaf network devices of the P2MP ring LSP. In some examples, the leaf identification object may explicitly identify network addresses of those network devices that are to be leaf network devices of the P2MP ring LSP. In some examples, the leaf identification object may not explicitly identify the network addresses of prospective leaf network devices, but may include a network address of an ingress network device of the P2MP ring LSP from which a network device receiving the leaf identification object may implicitly determine that the network device is to be a leaf network device of the P2MP ring LSP. A network device determined to be a leaf network device may send a resource reservation response message (e.g., an RSVP RESV message) back to the ingress network device of the P2MP ring LSP.

In some examples in which the leaf identification object explicitly includes network addresses of leaf network devices, a network device determined to be a leaf network device may modify the leaf identification object by removing the network address of the leaf network device from the leaf identification object and send a modified resource reservation request message including the modified leaf identification object to a next hop.

The techniques described herein may provide one or more advantages. For example, an ingress network device of the P2MP ring LSP may send a single resource reservation request message (or in instances of a large number of leaves on a leaf identification object, a reduced number of resource reservation request messages) to establish a P2MP ring LSP without needing to send a resource reservation request message for each leaf network device of the P2MP ring LSP. In another example, network devices of a ring network may send resource reservation request messages without needing an Explicit Route Object (ERO) or Secondary Explicit Route Object (SERO), and send resource reservation response messages without needing a Record Route Object (RRO) or Secondary Record Route Object (SRRO). The techniques of this disclosure may avoid the need for hop-by-hop routing. In this way, signaling for P2MP ring LSPs is improved by reducing an amount of path and reservation state to be stored on the network devices for each P2MP ring LSP. This may conserve computing resources of network devices along the P2MP ring LSP, and may correspondingly allow for more scalability in using P2MP LSPs in ring networks.

In one example, a method includes receiving, by a network device and from an ingress network device of a ring network, a resource reservation request message to establish a point-to-multipoint (P2MP) ring label switched path (LSP), wherein the resource reservation request message includes a leaf identification object for identifying one or more leaf network devices of the P2MP ring LSP. The method also includes determining, by the network device and based on the leaf identification object, that the network device is one of the one or more leaf network devices of the P2MP ring LSP. The method further includes sending, by the network device and in response to determining that the network device is one of the one or more leaf network devices of the P2MP ring LSP and reserving resources according to the resource reservation request message, a resource reservation response message towards the ingress network device. The method further includes modifying, by the network device and based on the resource reservation request message, forwarding information of the network device to forward network traffic received on the P2MP ring LSP off of the P2MP ring LSP. The method also includes sending, by the network device and to a next hop network device along the P2MP ring LSP, the resource reservation request message.

In another example, a method includes sending, by an ingress network device of a ring network, a resource reservation request message to establish a point-to-multipoint (P2MP) ring label switched path (LSP), wherein the resource reservation request message includes a leaf identification object for identifying a plurality of leaf network devices of the P2MP ring LSP, wherein sending the resource reservation request message to establish the P2MP ring LSP comprises sending a single resource reservation request message without specifying an Explicit Route Object (ERO) or a Secondary Explicit Route Object (SERO). The method also includes receiving, by the ingress network device, a plurality of resource reservation response messages that each indicates that a respective portion of the P2MP ring LSP has been established and requested resources have been reserved by respective ones of the plurality of leaf network devices according to the resource reservation request message sent by the ingress network device. The method further includes modifying, based on each of the plurality of resource reservation request message, forwarding information of the ingress network device to forward network traffic on the P2MP ring LSP to the plurality of leaf network devices of the P2MP ring LSP.

In yet another example, a network device includes a plurality of physical interfaces for receiving traffic from two or more network devices of a plurality of network devices in a ring network. The one or more processors are configured to receive, from an ingress network device of the ring network, a resource reservation request message to establish a point-to-multipoint (P2MP) ring label switched path (LSP), wherein the resource reservation request message includes a leaf identification object for identifying one or more leaf network devices of the P2MP ring LSP; determine, based on the leaf identification object, that the network device is one of the one or more leaf network devices of the P2MP ring LSP; send, in response to determining that the network device is one of the one or more leaf network devices of the P2MP ring LSP and reserving resources according to the resource reservation request message, a resource reservation response message for the resource reservation request message towards the ingress network device; modify, based on the resource reservation request message, forwarding information of the network device to forward network traffic received on the P2MP ring LSP off of the P2MP ring LSP; and send the resource reservation request message to a next hop network device along the P2MP ring LSP.

In yet another example, a computer-readable storage medium of a network device storing instructions that cause a processor to: receive, from an ingress network device of the ring network, a resource reservation request message to establish a point-to-multipoint (P2MP) ring label switched path (LSP), wherein the resource reservation request message includes a leaf identification object for identifying one or more leaf network devices of the P2MP ring LSP; determine, based on the leaf identification object, that the network device is one of the one or more leaf network devices of the P2MP ring LSP; send, in response to determining that the network device is one of the one or more leaf network devices of the P2MP ring LSP and reserving resources according to the resource reservation request message, a resource reservation response message for the resource reservation request message towards the ingress network device; modify, based on the resource reservation request message, forwarding information of the network device to forward network traffic received on the P2MP ring LSP off of the P2MP ring LSP; and send the resource reservation request message to a next hop network device along the P2MP ring LSP.

The details of one or more examples are set forth in the accompanying drawings and the description below. Other features, objects, and advantages will be apparent from the description and drawings, and from the claims.

DETAILED DESCRIPTION

Figure 1:
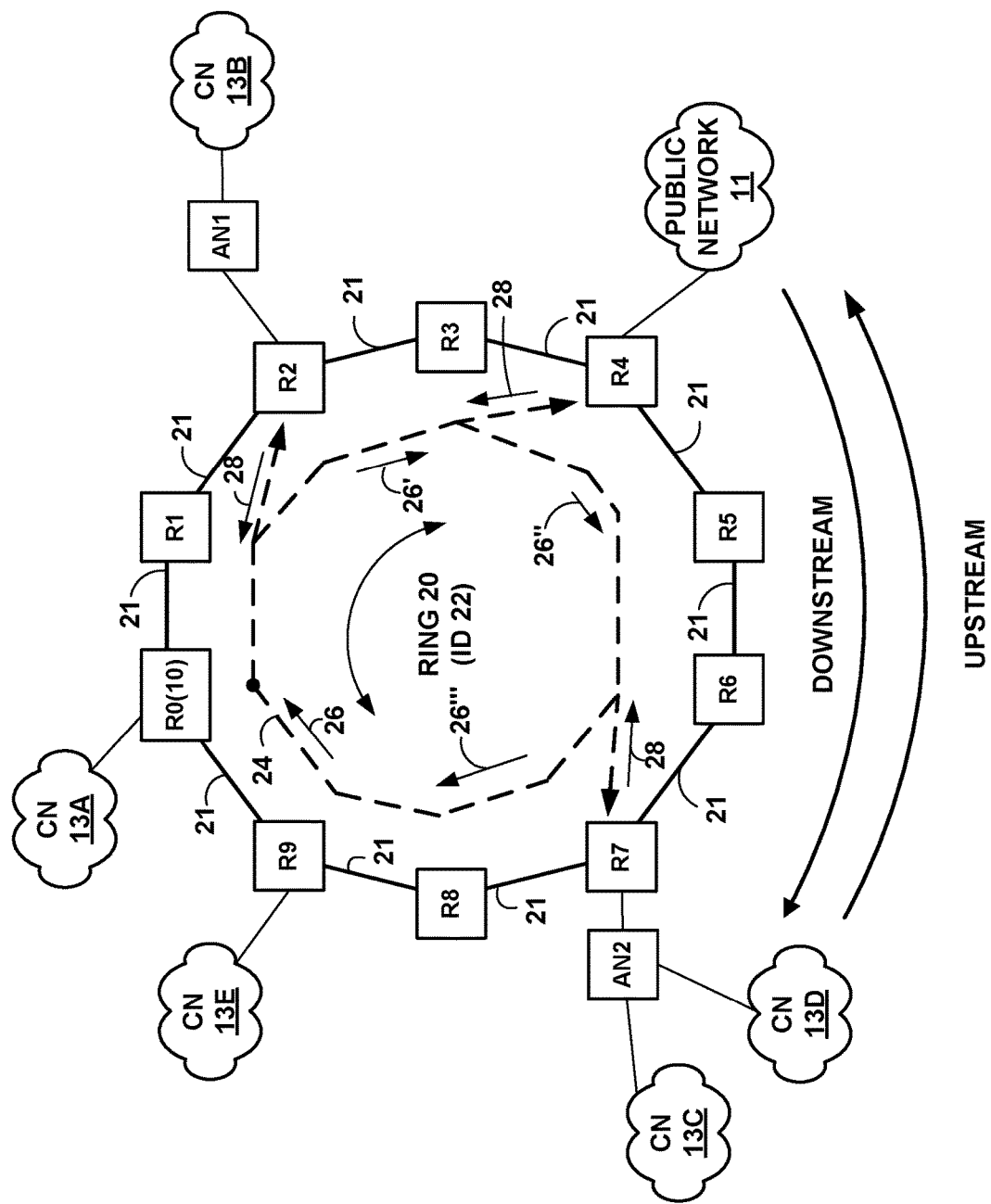
FIG. 1 is a block diagram illustrating an example network system for signaling a point-to-multipoint (P2MP) label switched path (LSP) in a ring network, in accordance with aspects of techniques described herein.

FIG. 1 is a block diagram illustrating an example network system 10 for signaling a point-to-multipoint (P2MP) label switched path (LSP) in a ring network without needing to send multiple resource reservation request messages, one for each leaf network device of the P2MP ring LSP, in accordance with aspects of the techniques described herein. As shown in the example of FIG. 1, network system 10 includes a collection of routers ("R"), e.g., R0-R9, that are arranged to form ring network 20. As shown in FIG. 1, ring network 20 operates as an access network for a plurality of customer networks 13A-13E. That is, ring network 20 operates to provide fast packet-based transport of communications between customer networks 13, and/or provide the customer networks access to public network, e.g., public network 11, such as the Internet or other provider networks.

Each of customer networks 13 may comprise a private network and may include local area networks (LANs) or wide area networks (WANs) that comprise a plurality of subscriber devices (not shown). The subscriber devices may include personal computers, laptops, workstations, personal digital assistants (PDAs), wireless devices, network-ready appliances, file servers, print servers or other devices. In some cases, the subscriber devices request and communicate multicast streams.

In general, the routers R0-R9 within ring network 20 use the multi-protocol label switching (MPLS) signaling mechanisms described herein to specify and signal "MPLS rings" and membership therein. As a result, the routers automatically establish label switched paths (LSPs) as components of the MPLS rings for packet transport within ring network 20. These LSPs may be traffic engineered.

As described herein, in example implementations an MPLS ring can be defined as follows. Given a graph G=(V, E), where V is a set of vertices (or nodes) and E a set of directed edges (or links), a ring R, such as ring network 20, is a sequence of nodes <R0, R1, R2, . . . , Rn>, where n is the number of ring nodes in the ring. A ring node is a router; the links are interfaces between routers (e.g., links 21). As used herein, R0 is the hub node for a given MPLS ring, and can also be represented as Rn. That is, the hub node for an MPLS ring is both the zeroth and nth node in the MPLS ring. In the example of FIG. 1, MPLS ring for ring network 20 has a hub node at a respective router R0 that may also be referred to as router R10 (denoted "R0(10)"), since n=10 in the example ring network. For each node i within the sequence of nodes, link (Ri, R(i+1)) and link (R(i+1), Ri) are both in the set of links E. That is, each node in a given MPLS ring is adjacent to the next and previous node in the ring by a pair of bidirectional links. Indices of adjacent nodes in the MPLS ring, other than the hub nodes, differ in this example by an increment of one and increase in a downstream (DS) direction (clockwise in the example of FIG. 1) from hub node R0 to node R(n−1). The other direction is, by way of example, represented as the upstream direction (counterclockwise). For example, in the example of FIG. 1, communications flowing in the downstream direction for the MPLS ring of ring network 20 traverse routers R0-R9 in a clockwise direction as this is the direction in which indices of the routers are defined in increasing order. Additional examples of ring networks are further described in U.S. Pat. No. 9,413,605, entitled "PATH PROTECTION FOR RING-BASED MULTI-PROTOCOL LABEL SWITCHED PATHS," and Kompella, K., et. al., "Resilient MPLS Rings," draft-ietf-mpls-rmr-06, Internet-Draft, Jan. 3, 2018, the entire contents of each of which are incorporated by reference herein.

The MPLS ring for ring network 20 is identified by a ring identifier that is unique across a service provider (SP) network or an administrative domain. In this example of FIG. 1, ring network 20 is assigned ring identifier 22. An MPLS ring may be constructed by assigning a ring identifier and index to each of the nodes that form the MPLS ring, and assigning a ring identifier to links between ring nodes that are to be used to carry traffic for the MPLS ring. In some examples herein, ring links between a pair of ring nodes may be treated as a single link, although these links may be bundled at the layer two (2) (e.g., as a Link Aggregation Group), or explicitly bundled at the layer three (L3) as a link bundle, or implicitly bundled by virtue of having the same ring identifier.

An administrator or network management system may manually define an MPLS ring, such as by assigning a new, unallocated ring identifier, assigning a hub node (e.g., router R0), and assigning the links that belong to the MPLS ring. Routers may also automatically define an MPLS ring by way of discovery using, for example, extensions described herein to an interior gateway protocol (IGP). As one example, IGP may be used to discover ring neighbors and ring interfaces. Based on network topology, each node may autonomously elect or may be configured to specify, which of its individual interfaces are coupled to links that form an MPLS ring being established. Using IGP, for example, each router R0-R9 of ring network 20 declares itself as a member of the MPLS ring and announces its ring identifier for the MPLS ring for which it is a member. Hub router R0 for the MPLS ring also declares, based on discovered neighbors, itself as the largest index in the ring (R0→Rn), which allows the MPLS ring to dynamically form as a closed loop.

In many cases, upon defining an MPLS ring, a service provider network may include other non-ring nodes, such as service nodes and access nodes, that may be attached to, but not be part of, the MPLS rings. In the example of FIG. 1, network system 10 includes access nodes AN1 that is single-homed to router R2 and AN2 that is single-homed to router R7. Although not shown in FIG. 1, other non-ring nodes may be connected to customer networks 13A-13E and public network 11. These non-ring nodes may be one or more hops away from an MPLS ring.

In example implementations, a ring LSP signaled by the routers starts and ends at the same router (or ring node) Ri. As used herein, Ri is an anchor router for the ring LSP, i.e., where the ring LSP starts and ends. Each router is an anchor for one of the n ring LSPs defined on a ring with n nodes. Each anchor node creates an LSP addressed to itself. This ring LSP may contain a pair of counter-rotating unicast LSPs.

One example of a ring LSP described herein is a P2MP ring LSP (which may also be referred to as "P2MP tunnels") that starts on one ring node of the MPLS ring and ends on any of the other ring nodes of the MPLS ring. In the example of FIG. 1, the MPLS ring constructed for ring network 20 includes P2MP ring LSP 24 that starts with router R0 and ends with any of routers R1-R9, e.g., routers R2, R4, and R7. That is, P2MP ring LSP 24 comprises two counter-rotating multicast LSPs in which router R0 is the ingress and routers R2, R4, and R7 are egresses. Traffic may enter ring network 20 from router R0, and is sent towards any of egress routers R2, R4, and/or R7 either in a clockwise direction or counter-clockwise direction, or both, on P2MP ring LSP 24. Although FIG. 1 is illustrated with a single P2MP ring LSP, each router within an MPLS ring can initiate setup of a P2MP ring LSP, each of the P2MP ring LSPs having a different ring LSP identifier.

When establishing one or more ring LSPs of ring network 20, each of routers R0-R9 learns, either through auto-discovery described above or configuration, that it is a router of a defined ring. Each of routers R0-R9 is able to learn the index for other routers on the ring and is able to autonomously select the interfaces and links to be used for the ring. In addition, each of routers R0-R9 autonomously signals each individual ring LSP of the ring network. For example, router R0 may use a resource reservation protocol such as the Resource Reservation Protocol with Traffic Engineering extensions (RSVP-TE) to establish P2MP ring LSP 24 that extends from router R0 to any of routers R1-R9. Further examples of RSVP-TE are described in D. Awduche et. al, "RSVP-TE: Extensions to RSVP for LSP Tunnels," Request for Comments 3209, December 2001, the entire contents being incorporated by reference herein. Router R0 may use RSVP-TE to maintain routing communication sessions with peer routers (e.g., routers R1-R9) and output control-plane messages, e.g., resource reservation request messages (RSVP PATH messages) and resource reservation response messages (RSVP RESV messages), to signal membership of ring LSPs. For illustrative purposes, FIG. 1 is described with respect to the RSVP-TE protocol, but routers R0-R9 may use non-resource reservation protocol mechanisms, e.g., Label Distribution Protocol (LDP), for establishing the P2MP ring LSP 24.

In signaling P2MP ring LSP 24, router R0 may create two path messages traveling in opposite directions. That is, resource reservation request messages, e.g., RSVP PATH messages, are sent in a downstream direction (clockwise and counter-clockwise) and contain a corresponding upstream label for the advertising router and any traffic specification (TSPEC) for the data to be carried by the ring LSP. In this way, the RSVP PATH messages automatically create the upstream LSP of the bidirectional ring LSP, e.g., P2MP ring LSP 24. RSVP RESV messages are automatically issued by each router of the ring network and are sent in the upstream direction. The RSVP RESV messages may advertise a downstream label for the sending router, include an upstream TSPEC, and automatically create the downstream LSP of P2MP ring LSP 24. Additional examples of configuration of ring networks are further described in Deshmukh, A., et. al., "RSVP Extensions for RMR," draft-deshmukh-mpls-rsvp-rmr-extension-01, Internet-Draft, Sep. 8, 2017, the entire contents of which is incorporated by reference herein.

In the example of FIG. 1, router R0 may operate as a sole ingress router of the P2MP ring LSP 24. Since, in this example implementation, P2MP ring LSP 24 is a bidirectional, point-to-multipoint LSP, P2MP ring LSP 24 allows router R0 within ring network 20 to operate as an ingress to source packet traffic into the P2MP ring LSP 24 for transporting to any of egress routers R2, R4, or R7 in an upstream direction and/or downstream direction around ring network 20. For example, downstream traffic being added to the ring may arrive at router R0 from non-ring nodes connected to router R0. Downstream traffic arrives at each router in ring network 20 from its upstream neighbor on one or more interfaces selected as components of the ring. Egress routers of P2MP ring LSP 24, e.g., R2, R4, or R7, receives all of the traffic from its upstream neighbors and sends the traffic to non-ring nodes connected to and reachable through egress routers (e.g., customer network 13B via router R2).

Although ring network 20 is illustrated as including a single P2MP ring LSP 24, ring network 20 may, in some examples, include multiple P2MP rings. In this case, each of routers R1-R9 may have its own set of ring LSPs. For example, a second P2MP ring LSP (not shown) may be established with router R2 in which router R2 is the sole ingress and the second P2MP ring LSP terminates on any of routers R4, R7, R9, and R10 for the second P2MP ring LSP.

In the example of FIG. 1, router R0 may source packet traffic into the P2MP ring LSP 24 for transporting to a plurality of egress routers in ring network 20. For example, router R0 may send multicast traffic to multiple leaf routers, e.g., egress routers R2, R4, and R7. To establish P2MP ring LSP 24, instead of sending multiple resource reservation request messages, one to each of the leaf routers R2, R4, and R7 to establish a respective sub-LSP (otherwise referred to herein as "branching"), the techniques described herein describe sending a single resource reservation request message (or a small number of resource reservation request messages in instances where the number of leaves exceed the capacity of the leaf identification object), without establishing sub-LSPs of the P2MP ring LSP for each of routers R2, R4, and R7.

In accordance with the techniques described herein, a P2MP ring LSP is signaled without needing to send multiple resource reservation request messages, one for each leaf network device (otherwise referred to herein as "node") of P2MP ring LSP 24. For example, a single resource reservation request message is used to establish P2MP ring LSP 24 (or a small number of resource reservation request messages in instances where the number of leaves exceed the capacity of the leaf identification object) to prospective leaf routers R2, R4, and R7. To establish P2MP ring LSP 24, ingress router R0 may send a resource reservation request message 26 (e.g., an RSVP PATH message) including a ring object that comprises at least a ring ID field (e.g., ring ID 22) that uniquely identifies a particular ring and a direction field (e.g., clockwise) that indicates a direction in which a resource reservation request message will travel along the ring. The inclusion of the ring object in a resource reservation request message triggers a router in ring network 20 to perform the techniques described herein. For example, resource reservation request message 26 may also include a leaf identification object for identifying one or more leaf routers of P2MP ring LSP 24.

In some examples, the leaf identification object may include a source-to-leaf (S2L) Sub-LSP Descriptor List object that has been repurposed, according to the techniques of this disclosure, to include network addresses, e.g., IP addresses, of routers that are prospective leaf routers of P2MP ring LSP 24. In the example of FIG. 1, router R0 may have information indicating which routers are to be leaf routers of P2MP ring LSP 24 and may construct a leaf identification object that explicitly identifies routers R2, R4, and R7 as prospective leaf routers of P2MP ring LSP 24. Router R0 may send the resource reservation request message 26 including the leaf identification object to a next hop in the clockwise direction (or counterclockwise if indicated in the direction field of the ring object). In this example, the resource reservation request message 26 is sent without including an Explicit Route Object (ERO) that encodes a path from the ingress router to a first leaf router or a respective Secondary Explicit Route Object (SERO) that encodes a subsequent path from a branch router to another leaf router of a respective sub-LSP.

A router on ring network 20 that receives a leaf identification object included in a resource reservation request message may determine, based on the information in the leaf identification object, whether the router is identified as a prospective leaf router of P2MP ring LSP 24. If the router determines itself is not identified as a prospective leaf router for P2MP ring LSP 24 (e.g., router R1), the router may forward the resource reservation request message to a next hop. If the router determines itself is identified as a prospective leaf router for P2MP ring LSP 24, the router may program its forwarding information (i.e., "forwarding state") to operate as a leaf router of P2MP ring LSP 24, and sends a resource reservation response message (e.g., RSVP RESV message) to establish a P2MP ring LSP from the ingress to the leaf router. In this example, the resource reservation response message is sent without including a Record Route Object (RRO) that contains the hops traversed by the resource reservation request message (i.e., a recorded route of a first sub-LSP) or a Secondary Record Route Object (SRRO) that contains additional recorded routes for subsequent sub-LSPs.

In operation, router R1 may receive the resource reservation request message 26 from ingress router R0 and determine based on the leaf identification object that router R1 is not identified as a leaf router of P2MP ring LSP 24 (i.e., network address of router R1 is not in the leaf identification object). Router R1 may allocate a respective label object for a corresponding resource reservation response message in response to resource reservation request message 26. This label object indicates to a neighboring upstream router that router R1 is a downstream next hop router. Router R1 may forward the resource reservation request message 26 to router R2.

Router R2 may receive resource reservation request message 26 and determine, based on a leaf identification object included in resource reservation request message 26, that router R2 is identified as a leaf router of P2MP ring LSP 24. For example, router R2 may determine that a network address, e.g., IP address, of router R2 is included in the leaf identification object. In response to determining that router R2 is a prospective leaf router of P2MP ring LSP 24, router R2 may program its forwarding information based on the resource reservation request message 26 to send traffic off of P2MP ring LSP 24 (e.g., forwarding traffic to a network device outside of ring network 20 that is connected to and reachable through router R2 (e.g., customer network 13B)). Router R2 sends a resource reservation response message 28, e.g., RSVP RESV message, to ingress router R0 to establish a P2MP ring LSP from router R0 to router R2. In this way, router R2 may, in addition to being a transit router for ring network 20, may also operate as a leaf router (i.e., egress) of P2MP ring LSP 24.

Router R2 may modify the leaf identification object by removing router R2 from the leaf identification object, and may save the leaf identification object locally. In some instances in which there are one or more additional downstream routers that are prospective leaf routers of P2MP ring LSP 24 (e.g., routers R4 and R7), router R2 may send the modified leaf identification object in a modified resource reservation request message 26' to a next hop. That is, instead of ingress router R0 sending a second resource reservation request message to establish a sub-LSP to router R4, for example, router R2 may send to the next hop the modified resource reservation request message 26' including the modified leaf identification object.

To determine whether to send the resource reservation request message to a next hop, router R2 may determine whether the leaf identification object includes a network address of a downstream router. For example, after modification of the leaf identification object, router R2 may determine that there are additional network addresses in the leaf identification object (i.e., network addresses of routers R4 and R7 are included in the leaf identification object). Router R2 may send the modified resource reservation request message to the next hop if: (1) the path state (i.e., forwarding state) is newly created, or (2) the leaf identification object is not the same as what was sent before. That is, if router R2 determines that the leaf identification object includes at least one network address of a prospective leaf router and the path state is newly created, then router R2 sends the modified resource reservation request message including the modified leaf identification object to a next hop. In some examples, if router R2 determines that the leaf identification object includes at least one network address of a prospective leaf router and the leaf identification object is different from a previously sent leaf identification object (e.g., from a prior signaling), router R2 sends the modified resource reservation request message including the modified leaf identification object to a next hop.

Alternatively, if the leaf identification object does not include additional leaf routers of P2MP ring LSP 24 (i.e., empty) after modification and resource reservation request message 26 is not new, router R2 may forward a teardown message, e.g., RSVP PATH teardown message, downstream. Moreover, if the path state is not newly created or the leaf identification object is the same as the leaf identification object that router R2 has previously received, then router R2 does not forward, e.g., drops, resources reservation request message 26 such that the resource reservation request message is not sent further.

In some examples, if the leaf identification object is empty after modification and the leaf identification object is different than a leaf identification object that was sent before, router R2 may send a teardown message, e.g., RSVP PATH Tear message, including the current leaf identification object to tear down the previous path.

In the example of FIG. 1, assume that the leaf identification object also identifies routers R4 and R7 as prospective leaf routers of P2MP ring LSP 24. As described above, router R2 may send the modified resource reservation request message including the modified leaf identification object to a next hop. Router R3 may receive the resource reservation request message 26' and determine that router R3 is not identified as a prospective leaf router of P2MP ring LSP 24. Router R3 may allocate a respective label object for a corresponding resource reservation response message in response to resource reservation request message 26'. This label object indicates to a neighboring upstream router that router R3 is a downstream next hop router. Router R3 may forward the resource reservation request message 26' to router R4.

Router R4 receives the modified resource reservation request message 26' and may determine, based on the modified leaf identification object included in modified resource reservation request message 26', that router R4 is identified as a prospective leaf router of P2MP ring LSP 24. In response to determining that router R4 is a prospective leaf router of P2MP ring LSP 24, router R4 may program its forwarding information based on the resource reservation request message 26' to send traffic to non-ring nodes connected to and reachable through router R4 (e.g., public network 11). Router R4 sends a resource reservation response message 28, e.g., RSVP RESV message, to ingress router R0 to establish a P2MP ring LSP from router R0 to router R4. In this way, router R4 may, in addition to being a transit router for ring network 20, may also operate as a leaf router (i.e., egress) of P2MP ring LSP 24.

Continuing the example above, router R4 may further modify the leaf identification object by removing the network address of router R4 from the leaf identification object. Router R4 may determine that the leaf identification object is not empty, and that the path state is newly created or the leaf identification object is different than a previously sent leaf identification object. In response, router R4 send a modified resource reservation request message 26" including the modified leaf identification object to a next hop.

Router R5 may receive the resource reservation request message 26" and determine that router R5 is not identified as a prospective leaf router of P2MP ring LSP 24. Router R5 may allocate a label object for a corresponding resource reservation response message in response to resource reservation request message 26". For example, the label object allocated by router R5 indicates to a neighboring upstream router (e.g., router R4) that router R5 is a downstream next hop router. Router R5 may forward the resource reservation request message 26" to router R6.

Similarly, router R6 may receive the resource reservation request message 26" and determine that router R6 is not identified as a prospective leaf router of P2MP ring LSP 24. Router R6 may allocate a label object for a corresponding resource reservation response message in response to resource reservation request message 26". For example, the label object allocated by router R6 indicates to a neighboring upstream router (e.g., router R5) that router R6 is a downstream next hop router. Router R6 may forward the resource reservation request message 26" to router R6.

Router R7 receives the modified resource reservation request message 26", router R7 may determine, based on the modified leaf identification object included in modified resource reservation request message 26", that router R7 is identified as a prospective leaf router of P2MP ring LSP 24. For example, router R7 may determine that a network address of router R7 is included in the leaf identification object. In response to determining that router R7 is a prospective leaf router of P2MP ring LSP 24, router R7 may program its forwarding information based on the resource reservation request message 26" to send traffic to a network device outside ring network 20 that is connected to and reachable through router R7 (e.g., customer networks 13C or 13D). Router R7 sends a resource reservation response message 28, e.g., RSVP RESV message, to ingress router R0 to establish a P2MP ring LSP from router R0 to router R7. In this way, router R7 may, in addition to being a transit router for ring network 20, may also operate as a leaf router (i.e., egress) of P2MP ring LSP 24.

Continuing the example above, router R7 may further modify the leaf identification object by removing the network address of router R7 from the leaf identification object. Router R7 may determine that the leaf identification object is empty, and that the path state is newly created or the leaf identification object is not different than a previously sent leaf identification object. In response, router R7 may drop the resource reservation request message 26" such that the resource reservation request message is not sent further.

If a leaf router is no longer a leaf router (e.g., no longer listed in the leaf identification object or no longer an implicit leaf), the router modifies its forwarding state to no longer forward traffic to a network device outside ring network 20. The router may send a teardown message to a previous hop if there is no resource reservation response message received from its downstream next hop.

In this way, signaling for P2MP ring LSPs is improved by sending a single resource reservation message (or in instances of a large number of leaves on a leaf identification object, a small number of resource reservation request messages) to establish a P2MP ring LSP without needing send a resource reservation request message for each leaf network device of the P2MP ring LSP, and without having to signal or maintain state for individual sub-LSPs of a P2MP ring LSP. Moreover, network devices of a ring network may send resource reservation request messages without needing an Explicit Route Object (ERO) or Secondary Explicit Route Object (SERO), and send resource reservation response messages without needing a Record Route Object (RRO) or Secondary Record Route Object (SRRO) or hop-by-hop routing. In this way, signaling for P2MP ring LSPs is streamlined through the reduction of path and reservation states to be stored on the network devices for each P2MP ring LSP. This may conserve computing resources of network devices along the P2MP ring LSP, and may correspondingly allow for more scalability in using P2MP LSPs in ring networks.

In some example, if the ring network 20 is part of a general resource reservation protocol network, the techniques described above can also be applied on the ring network devices. For example, if the ingress of the P2MP ring LSP knows the prospective leaf routers that are on the ring, the ingress may include all those leaves in a single resource reservation request message and construct an ERO/SERO only towards the entry points on the ring. The entry points then include the ring object (e.g., Ring ID and direction) in the resource reservation request messages that are sent into the ring. For leaves beyond the ring, the ingress may include the exit points on the ring as loose hops in the ERO/SERO, and when a ring node needs to send the resource reservation request message off the ring, it removes the ring object.

Figure 2:
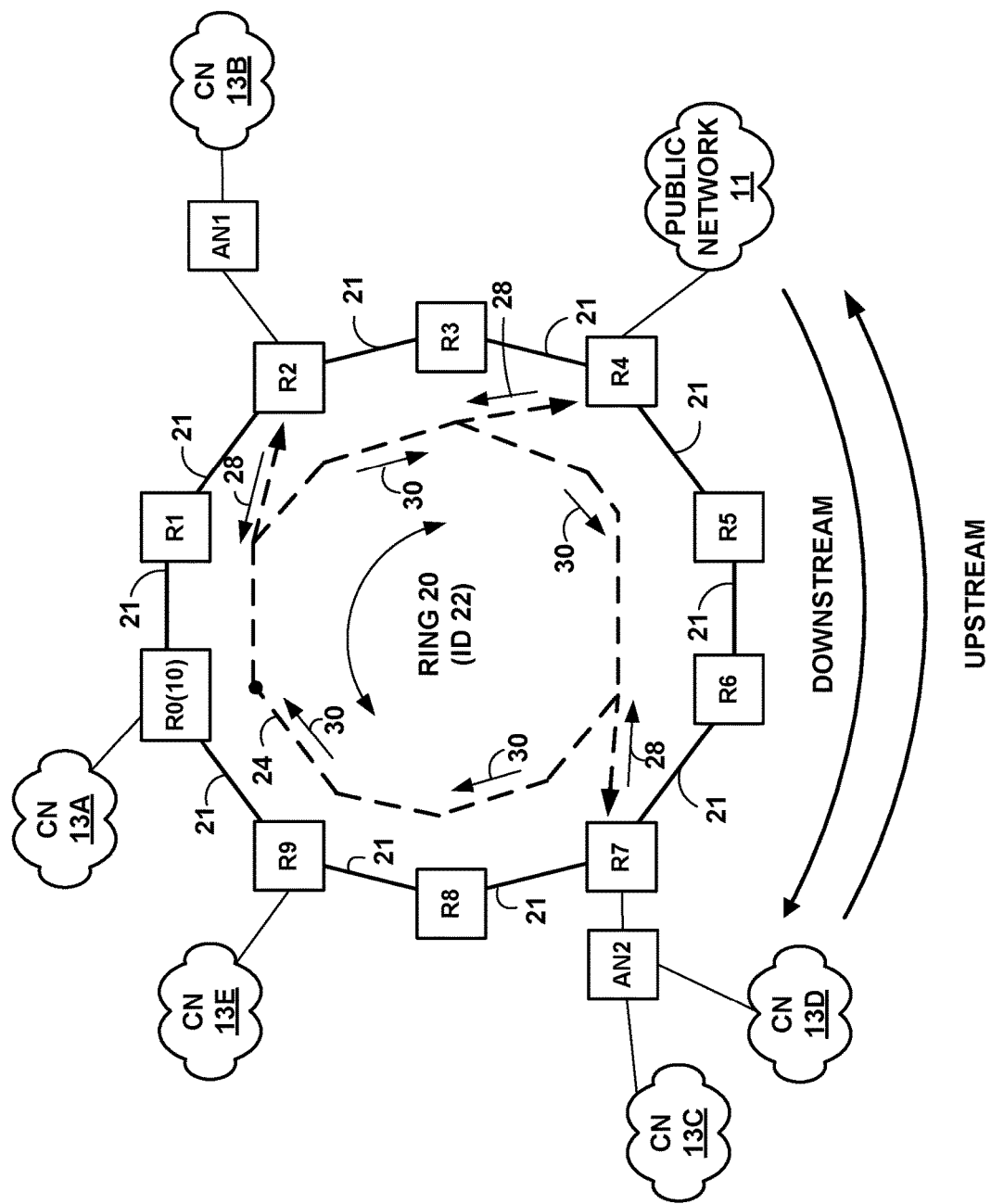
FIG. 2 is a block diagram illustrating another example for signaling a P2MP LSP in a ring network, in accordance with aspects of techniques described herein.

FIG. 2 is a block diagram illustrating another example for signaling a P2MP LSP in a ring network without needing to send multiple resource reservation request messages, one for each leaf network device of the P2MP ring LSP, in accordance with aspects of the techniques described herein. Ring network 20 of FIG. 2 is similar to ring network 20 of FIG. 1 except as described below. Although FIG. 2 is illustrated with a leaf identification object that implicitly identifies one or more prospective leaf routers, the techniques described herein may provide for a single leaf identification object that both explicitly (as described in FIG. 1) and implicitly identifies one or more prospective leaf routers of P2MP ring LSP 24.

In the example of FIG. 2, the leaf identification object may not explicitly identify the network addresses of prospective leaf network devices, but instead includes a network address of an ingress network device of the P2MP ring LSP in the leaf identification object, from which a network device receiving the leaf identification object is configured to implicitly determine that the network device is to be a leaf network device of the P2MP ring LSP. In the example of FIG. 2, ingress router R0 (i.e., the tunnel root) constructs a leaf identification object that includes a network address of ingress router R0 of P2MP ring LSP 24, and sends the leaf identification object in a resource reservation request message 30. In some examples where the leaf identification object both explicitly and implicitly identifies network addresses of prospective leaf network devices of P2MP ring LSP 24, ingress router R0 may encode the network address of router R0 as the last element of the leaf identification object. In examples in which the leaf identification object does not explicitly identify any network addresses of prospective leaf network devices of P2MP ring LSP 24 but is used only for implicit leaf node identification, ingress router R0 may encode the network address of router R0 as the only element of the leaf identification object, as further described below.

A router on ring network 20 is configured to implicitly determine whether the router is to be a leaf router of P2MP ring LSP. For example, router R2 may receive a resource reservation request message 30 originated from ingress router R0 that includes a leaf identification object encoding a network address of ingress router R0. Router R2 may also determine the sender (originator) of resource reservation request message 30 based on other portions of the resource reservation request message 30 other than the leaf identification object (i.e., through sender information included elsewhere in an RSVP PATH message). In response to determining that the leaf identification object includes the network address of the ingress router R0 that is the same as the original sender, router R2 may determine whether router R2 is a prospective leaf router of P2MP ring LSP 24, e.g., based on configuration information stored by router R2 indicating which P2MP ring LSPs and/or which senders for which R2 should be a leaf router. In some examples, router R2 may be manually configured prior to receiving the resource reservation request message 30 to be a leaf router of P2MP ring LSP 24. In some examples, router R2 may dynamically determine (e.g., through an application that will use the P2MP ring LSP), that router R2 is a prospective leaf router of P2MP ring LSP 24.

In response to receiving resource reservation request message 30 and determining that router R2 is a prospective leaf router of P2MP ring LSP 24, router R2 may program its forwarding information based on the resource reservation request message 30 to send traffic to a network device outside ring network 20 that is connected to and reachable through router R2 (e.g., customer networks 13B). Router R2 sends a resource reservation response message 28, e.g., RSVP RESV message, to ingress router R0 to establish a P2MP ring LSP from router R0 to router R2. In this way, router R2 may, in addition to being a transit router for ring network 20, may also operate as a leaf router (i.e., egress) of P2MP ring LSP 24.

To determine whether to send the resource reservation request message to a next hop along P2MP ring LSP 24, router R2 may determine whether the leaf identification object includes a network address of the ingress router R0. In this example, router R2 may forward the same resource reservation request message 30 including the leaf identification object encoding the network address of the ingress router R0 to a next hop, e.g., without modifying the resource reservation request message 30.

Router R4 may also be configured to implicitly determine whether it is to be a leaf router of P2MP ring LSP 24. For example, router R4 subsequently receives the resource reservation request message 30 originated from ingress router R0 and determines, based on the leaf identification object included in resource reservation request message 30, that the network address of ingress router R0 is included in the leaf identifier object. Router R4 may also determine the originator of reservation request message 30, and in response to determining that the leaf identification object includes the network address of ingress router R0 that is the same as the original sender, router R4 may determine whether router R4 is a prospective leaf router of P2MP ring LSP 24. For example, router R4 may perform a lookup of stored configuration information that indicates which P2MP ring LSP and/or which senders for which R4 should be a leaf router. In some examples, router R4 is manually configured prior to receiving the resource reservation request message 30 to be a leaf router of P2MP ring LSP 24. In some examples, router R4 may dynamically determine (e.g., by exchanging SNMP messages), that router R4 is a prospective leaf router of P2MP ring LSP 24.

In response to receiving resource reservation request message 30 and determining that router R4 is a prospective leaf router of P2MP ring LSP 24, router R4 may program its forwarding information based on the resource reservation request message 30 to send traffic to a network device outside ring network 20 that is reachable through router R4 (e.g., public network 11). Router R4 sends a resource reservation response message 28, e.g., RSVP RESV message, to ingress router R0 to establish a P2MP ring LSP from router R0 to router R4. In this way, router R4 may, in addition to being a transit router for ring network 20, may also operate as a leaf router (i.e., egress) of P2MP ring LSP 24.

Router R4 may determine that the leaf identification object includes the network address of the ingress router R0, and sends the resource reservation request message 30 including the leaf identification object encoding the network address of the ingress router R0 to a next hop.

Router R7 may also be configured to implicitly determine whether it is to be a leaf router of P2MP ring LSP 24. For example, router R7 subsequently receives the resource reservation request message 30 and determines, based on the leaf identification object included in modified resource reservation request message 30, that the network address of ingress router R0 is included in the leaf identifier object. Router R7 may also determine the originator of reservation request message 30, and in response to determining that the leaf identification object includes the network address of ingress router R0 that is the same as the original sender, router R7 may determine whether router R7 is a prospective leaf router of P2MP ring LSP 24. For example, router R7 may perform a lookup of stored configuration information that indicates which P2MP ring LSP and/or which senders for which R7 should be a leaf router. In some examples, router R7 is manually configured prior to receiving the resource reservation request message 30 to be a leaf router of P2MP ring LSP 24. In some examples, router R7 may dynamically determine (e.g., by exchanging SNMP messages), that router R7 is a prospective leaf router of P2MP ring LSP 24.

In response to receiving resource reservation request message 30 and determining that router R7 is a prospective leaf router of P2MP ring LSP 24, router R7 may program its forwarding information based on the resource reservation request message 30 to send traffic to a network device outside ring network 20 that is connected to and reachable through router R7 (e.g., customer networks 13C or 13D). Router R7 sends a resource reservation response message 28, e.g., RSVP RESV message, to ingress router R0 to establish a P2MP ring LSP from router R0 to router R7. In this way, router R7 may, in addition to being a transit router for ring network 20, may also operate as a leaf router (i.e., egress) of P2MP ring LSP 24.

Router R7 may determine that the leaf identification object includes the network address of the ingress router R0, and sends the resource reservation request message 30 including the leaf identification object encoding the network address of the ingress router R0 to a next hop. The resource reservation request message 30 may be received by each of the routers of ring network 20 until ingress router R0 receives resource reservation request message 30. In this way, any of routers R1-R9 that receives resource reservation request message 30 including a leaf identification object encoding a network address or ingress router R0 may implicitly determine whether the network device is to be a leaf network device of P2MP ring LSP 24.

In some examples, the leaf identification object may explicitly identify one or more prospective leaf routers of P2MP ring LSP and implicitly identify one or more prospective leaf routers of P2MP ring LSP 24. In this example, ingress router R0 may encode one or more network addresses of prospective leaf routers of P2MP ring LSP 24, and may also include the network address of router R0 as the last element of the leaf identification object. When a router of ring network 20 receives the leaf identification object and determines it is explicitly identified in a leaf identification object, the router may program its forwarding information based on the resource reservation request message to send traffic to a network device connected to an reachable through the router, modifies the leaf identification to remove the router from the leaf identification object, and forwards the modified leaf identification object in the modified resource reservation request message to the next hop in the P2MP ring LSP (as described in FIG. 1). When a router of ring network 20 receives the leaf identification object and determines it is not explicitly identified in a leaf identification object, but the determines that the network address of ingress router R0 is included in the leaf identification object (e.g., as the last element), the router determines whether it is a prospective leaf router of P2MP ring LSP 24, e.g., based on configuration information stored by the router indicating which P2MP ring LSPs and/or which senders for which the router should be a leaf router, and if so, the router may program its forwarding information based on the resource reservation request message to send traffic to a network device connected to an reachable through the router and forwards the leaf identification object received from the previous hop to the next hop in the P2MP ring LSP (as described in FIG. 2).

Figure 3:
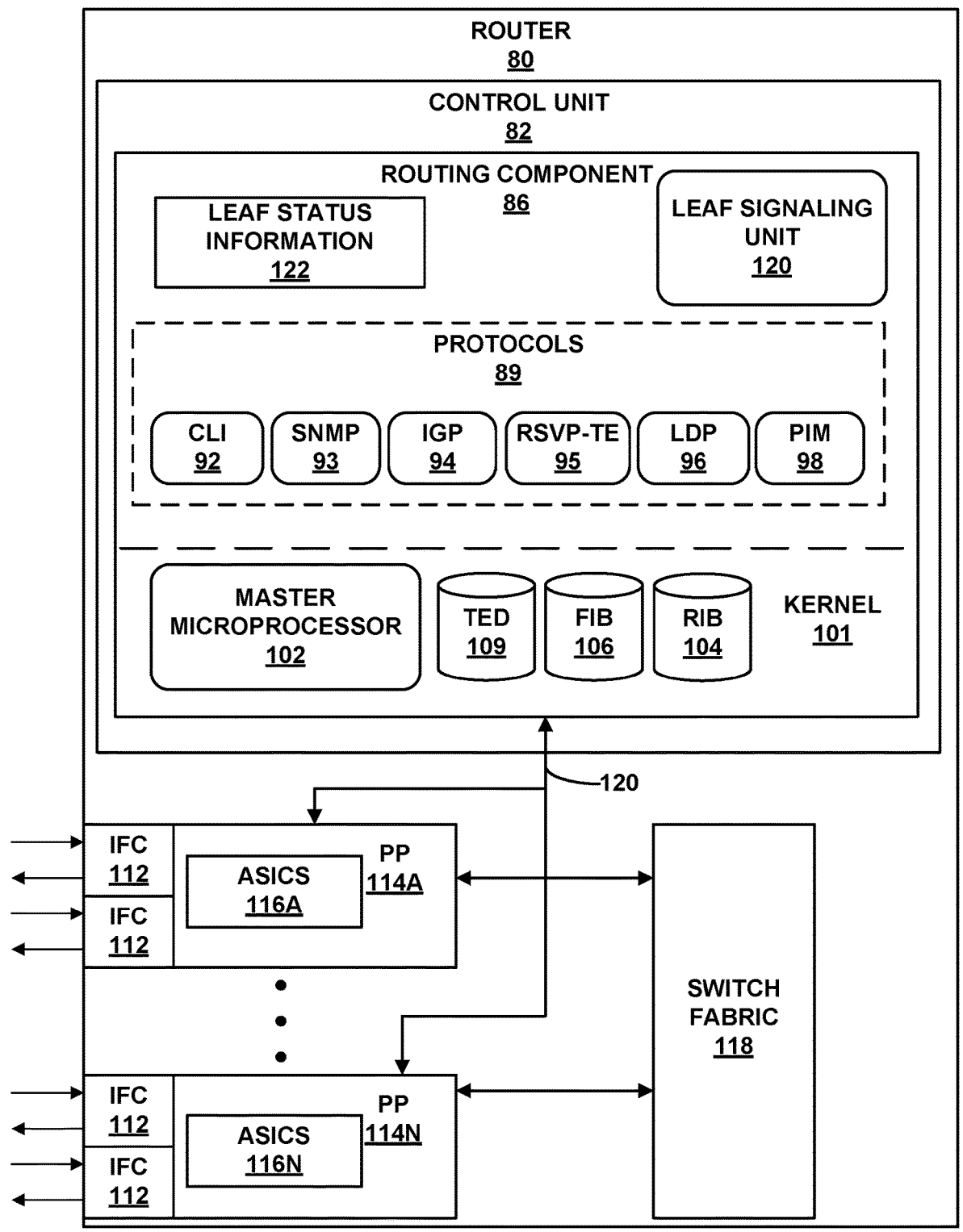
FIG. 3 is a block diagram illustrating an example device, e.g., a router, capable of implementing the techniques described herein.

FIG. 3 is a block diagram illustrating an example device, e.g., a router, capable of implementing the techniques described herein. Router 80 may comprise a gateway, an edge or access router, a core router, a switch or other device that forwards MPLS traffic using ring LSPs in accordance with the techniques described herein. Router 80 is described for purposes of example with respect to any of routers R0-R9 of FIGS. 1 and 2.

In the example of FIG. 3, router 80 includes control unit 82 in which routing component 86 provides control plane functionality for router 80. Router 80 also includes a plurality of packet processors 114A-114N ("PPs 114"), such as packet-forwarding engines, and a switch fabric 118 that collectively provide a forwarding plane (otherwise referred to as "data plane") for forwarding network traffic. PPs 114 receive and send data packets via interface cards 112 ("IFCs 112"). In other embodiments, each of PPs 114 may comprise more or fewer IFCs. Although not shown, PPs 114 may each comprise a central processing unit (CPU) and a memory. In this example, routing component 86 is connected to each of PPs 114 by a dedicated internal communication link 120. For example, dedicated link 120 may comprise a Gigabit Ethernet connection. Switch fabric 118 provides a high-speed interconnect for forwarding incoming data packets between PPs 114 for transmission over a network. For example, router 80 may be a multi-chassis router in which a multi-stage switch fabric, such as a 3-stage Clos switch fabric, is used as a high-end forwarding plane to relay packets between multiple routing nodes of the multi-chassis router.

Routing component 86 provides an operating environment for execution of various protocols 89 that may comprise software processes having instructions executed by a computing environment. As described in further detail below, protocols 89 provide control plane functions for storing network topology in the form of routing tables or other structures, executing routing protocols to communicate with peer routing devices and maintain and update the routing tables, and providing management interface(s) to allow user access and configuration of router 80. Control unit 82 provides an operating environment for routing component 86 and may be implemented solely in software, or hardware, or may be implemented as a combination of software, hardware or firmware. For example, control unit 82 may include one or more processors which execute software instructions. In that case, routing component 86 may include various software modules or daemons (e.g., one or more routing protocol processes, user interfaces and the like), and control unit 82 may include a computer-readable storage medium, such as computer memory or hard disk, for storing executable instructions.

Command line interface daemon 92 ("CLI 92") provides an interface by which an administrator or other management entity may modify the configuration of router 80 using text-based commands. Simple Network Management Protocol daemon 93 ("SNMP 93") comprises an SNMP agent that receives SNMP commands from a management entity to set and retrieve configuration and management information for router 80. Using CLI 92 and SNMP 93, management entities may enable/disable and configure services, install routes, enable/disable and configure rate limiters, and configure interfaces, for example.

One or more routing protocols, such as IGP 94, maintains routing information in the form of routing information base (RIB) 104 that describes a topology of a network, and derives a forwarding information base (FIB) 106) in accordance with the routing information. In some examples, router 80 may also maintain a label FIB storing MPLS labels, which may be a separate data structure or part of FIB 106. In general, the routing information represents the overall topology of the network. IGP 94 interacts with kernel 101 (e.g., by way of Application Programming Interface (API) calls) to update RIB 104 based on routing protocol messages received by router 80. RIB 104 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 106 is generated based on selection of certain routes within the network and maps packet key information (e.g., destination information and other select information from a packet header) to one or more specific next hops and ultimately to one or more specific output interface ports of IFCs 112. Routing component 86 may generate the FIB in the form of a radix tree having leaf nodes that represent destinations within the network.

Routing component 86 also provides an operating environment of one or more traffic engineering protocols to establish tunnels for forwarding subscriber packets through the ordered set of service nodes associated with different service chains. For example, RSVP-TE 95 may execute the Resource Reservation Protocol with Traffic Engineering extensions to exchange traffic engineering (TE) information, such as MPLS labels for enabling label-based packet forwarding. Routing component 86 may, as another example, execute the Label Distribution Protocol 96 to signal MPLS rings and ring LSPs as described herein. As another example, routing component 86 may use GRE or IP-based tunneling protocols to establish traffic engineered tunnels. Routing component 86 may maintain, for example, a traffic engineering database (TED) 109 to store the traffic engineering data.

RSVP-TE 95 may maintain routing communication sessions with peer routers and output control-plane signaling messages, such as resource reservation request messages (e.g., RSVP PATH messages) and resource reservation response messages (e.g., RSVP RESV messages) as described herein to signal membership of ring LSPs (e.g., P2MP ring LSP 24 of FIG. 1). Moreover, RSVP-TE 95 may program RIB 104 and/or FIB 106 with forwarding labels for a P2MP ring LSP as learned from the peer router, which in turn causes kernel 101 to program forwarding ASICS 116 with forwarding entries for forwarding MPLS traffic as described herein. In some examples, RSVP-TE 95 may implement automatic bandwidth management functions for LSP rings based on provisioning information received via CLI 92 or SNMP 93, for example. In addition, or alternatively, LDP 96 may perform these functions. IGP 94 may be extended for auto-discovery of MPLS rings and ring LSPs.

Routing component 86 communicates data representative of a software copy of the FIB 106 into each of PPs 114 to control forwarding of traffic within the forwarding plane. This allows the software FIB stored in memory (e.g., RAM) in each of PPs 114 to be updated without degrading packet-forwarding performance of router 80. In some instances, routing component 86 may derive separate and different software FIBs for each respective PPs 114. In addition, one or more of PPs 114 include application-specific integrated circuits (ASICs 116) that PPs 114 program with a hardware-copy of the FIB based on the software FIBs (i.e., hardware versions of the software FIBs) copied to each respective PPs 114.

For example, kernel 101 executes on master microprocessor 102 and may comprise, for example, a UNIX operating system derivative such as Linux or Berkeley Software Distribution (BSD). Kernel 101 processes kernel calls from IGP 94 and RSVP-TE 95 to generate forwarding information in the form of FIB 106 based on the network topology represented in RIB 104, i.e., performs route resolution and path selection. Typically, kernel 101 generates FIB 106 in the form of radix or other lookup trees to map packet information (e.g., header information having destination information and/or a label stack) to next hops and ultimately to interface ports of interface cards associated with respective PPs 114. FIB 106 may associate, for example, network destinations with specific next hops and corresponding IFCs 112. For MPLS-related traffic forwarding, FIB 106 stores, for a given FEC, label information that includes an incoming label, an outgoing label, and a next hop for a packet.

Master microprocessor 102 executing kernel 101 programs PPs 114 to install copies of the FIB 106. Microprocessor 102 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein. Example details of an example router in which a processor programs one or more forwarding components are provided in U.S. Pat. No. 7,990,993, the contents of which being incorporated herein by reference in its entirety.

In this example, ASICs 116 are microcode-controlled chipsets (i.e., forwarding circuits) programmably configured by a slave microprocessor executing on each of PPs 114. When forwarding packets, control logic with each ASIC 116 traverses the forwarding information (FIB 106) received from routing component 86 and, upon reaching a FIB entry for the packet (e.g., a leaf node), microcode-implemented control logic automatically selects a forwarding next hop and processes the packets in accordance with the operations defined within the next hop. In this way, ASICs 116 of PPs 114 process packets by performing a series of operations on each packet over respective internal packet forwarding paths as the packets traverse the internal architecture of router 80. Operations may be performed, for example, on each packet based on any of a corresponding ingress interface, an ingress PP 114, an egress PP 114, an egress interface or other components of router 80 to which the packet is directed prior to egress, such as one or more service cards. PPs 114 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PPs 114 arranges forwarding structures as next hop data that can be chained together as a series of "hops" along an internal packet forwarding path for the network device. In many instances, the forwarding structures perform lookup operations within internal memory of ASICs 116, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 116 determines the way a packet is forwarded or otherwise processed by PPs 114 from its input interface on one of IFCs 112 to its output interface on one of IFCs 112.

In general, kernel 101 may generate FIB 106 and thereby program ASICs 116 to store forwarding structures associated with each service chain. For example, ASICs 116 may be configured with forwarding information that specifies traffic engineering information, such as IP header information or MPLS labels, as well as operations for causing programmable ASICs 116 to encapsulate packets in accordance with the forwarding information.

Router 80 may include a leaf signaling unit 120 that operates in accordance with the techniques described herein. In some examples in which router 80 may represent prospective leaf routers (e.g., routers R2, R4, and/or R7 of FIGS. 1 and 2) of P2MP ring LSP 24, router 80 may include a leaf signaling unit 120 for determining whether router 80 is a prospective leaf router, and if so, modifying a leaf identification object to remove a network address of router 80 from the leaf identification object, sending a resource reservation response message, and sending a modified resource reservation request message to a next hop.

For example, in accordance with aspects of the techniques of this disclosure router 80, acting as an ingress, may use RSVP-TE 95 to construct a leaf identification object, e.g., S2L Sub-LSP Descriptor List, for identifying prospective leaf routers of P2MP ring LSP 24 without signaling sub-LSPs. In some examples, router 80 may include in the leaf identification object network addresses of one or more routers that are to be leaf routers of P2MP ring LSP 24. In some examples, router 80, acting as an ingress, may include in the leaf identification object a network address of router 80 such that a router in the ring network receiving the leaf identification object may be implicitly triggered to determine (e.g., based on additional stored information such as leaf status information 122) that the router is to be a leaf network device of P2MP ring LSP 24. In other examples, router 80 may include network addresses of one or more routers that are to be leaf routers of the P2MP ring LSP 24 and a network address of router 80 encoded, e.g., as the last network address in the leaf identification object.

As a prospective leaf router, router 80 may receive a resource reservation request message, e.g., an RSVP PATH message in accordance with RSVP-TE 95, from an upstream router that includes a leaf identification object. In some examples, router 80 may include a leaf signaling unit 120 that may be a part of RSVP-TE 95, or a part of any signaling protocol, that determines whether the leaf identification object explicitly identifies router 80 as a prospective leaf router of P2MP ring LSP 24. For example, leaf signaling unit 120 may determine that the leaf identification object includes a network address (e.g., IP address) of router 80. In response to determining that router 80 is a prospective leaf router of P2MP ring LSP 24, leaf signaling unit 120 may trigger router 80 to program its forwarding information to send traffic to non-ring nodes connected to and reachable through router 80. For example, RSVP-TE 95 and/or leaf signaling unit 120 may program RIB 104 and/or FIB 106 with forwarding labels for P2MP ring LSPs as learned from the peer router, which in turn causes kernel 101 to program forwarding ASICS 116 with forwarding entries for forwarding MPLS traffic as described herein.

Leaf signaling unit 120 also sends a resource reservation response message (e.g., RSVP RESV message) in accordance with, e.g., RSVP-TE 95, to an ingress router of P2MP ring LSP 24 to establish a P2MP ring LSP from the ingress router to router 80 and indicate that resources have been reserved according to the associated resource reservation request message. In this way, router 80 may, in addition to being a transit router for ring network 20, may also operate as a leaf router (i.e., egress) of P2MP ring LSP 24.

Leaf signaling unit 120 may modify the leaf identification object by removing router 80 from the leaf identification object, and may save the leaf identification object, e.g., a Path State Block that stores state data from resource reservation request messages. In some instances in which there are one or more additional downstream routers that are prospective leaf routers of P2MP ring LSP 24, router 80 may send the modified leaf identification object in a modified resource reservation request message to a next hop. To determine whether to send the resource reservation request message to a next hop, leaf signaling unit 120 may determine whether the leaf identification object includes a network address of a downstream router. For example, after modification of the leaf identification object, leaf signaling unit 120 may determine that there are additional network addresses in the leaf identification object (i.e., network addresses of routers R4 and R7 of FIG. 1).

Router 80, via leaf signaling unit 120, may send the modified resource reservation request message to the next hop if: (1) the path state (i.e., forwarding state) is newly created, or (2) the leaf identification object is not the same as what was sent before. That is, if leaf signaling unit 120 determines that the leaf identification object includes at least one network address of a prospective leaf router and the path state is newly created, then router 80 sends the modified resource reservation request message including the modified leaf identification object to a next hop. In some examples, if leaf signaling unit 120 determines that the leaf identification object includes at least one network address of a prospective leaf router and the leaf identification object is different from a previously sent leaf identification object (e.g., previously stored), router 80 sends the modified resource reservation request message including the modified leaf identification object to a next hop.

Alternatively, if the leaf identification object does not include additional leaf routers of P2MP ring LSP 24 after modification, leaf signaling unit 120 instruct router 80 to drop the resource reservation request message such that the resource reservation request message is not sent to the next hop. Moreover, if the path state is not newly created or the leaf identification object is the same as the leaf identification object that router 80 has previously received and stored, then leaf signaling unit 120 instructs router 80 to drop the resources reservation request message.

In some examples, router 80, acting as a prospective leaf router, may receive a resource reservation request message, e.g., an RSVP PATH message in accordance with RSVP-TE 95, from an upstream router that includes a leaf identification object that encodes a network address of the ingress router of P2MP ring LSP 24. In these examples, leaf signaling unit 120 may determine that the leaf identification object includes a network address that is the same as the original sender (i.e., the ingress router of P2MP ring LSP 24) through sender information included elsewhere in an RSVP PATH message. In response, router 80 may determine whether router 80 is a prospective leaf router of P2MP ring LSP 24. For example, prior to receiving a resource reservation request message, router 80 may be manually configured (e.g., by receiving configuration information via CLI 92) to become a leaf router, and store this status information in leaf status information 122. In some examples, router 80 may dynamically determine (e.g., by receiving configuration commands via SNMP 93 or via IGP auto-discovery) that router 80 is to be a leaf router of P2MP ring LSP 24, and store this status information in leaf status information 122. In response to determining that the leaf identification object includes the network address of the ingress router that is the same as the original sender, leaf signaling unit 120 may perform a lookup of configuration information stored in leaf status information 122 to determine whether router 80 is to be a leaf router of P2MP ring LSP 24. In response to determining that router 80 is a prospective leaf router of P2MP ring LSP 24, leaf signaling unit 120 may trigger router 80 to program its forwarding information to send traffic to a network device outside of the ring network that is connected to and reachable through router 80. Leaf signaling unit 120 sends a resource reservation response message (e.g., RSVP RESV message) in accordance with, e.g., RSVP-TE 95, to an ingress router of P2MP ring LSP 24 to establish a P2MP ring LSP from the ingress router to router 80. In this way, router 80 may, in addition to being a transit router for ring network 20, may also operate as a leaf router (i.e., egress) of P2MP ring LSP 24.

The architecture of router 80 illustrated in FIG. 3 is shown for example purposes only. This disclosure is not limited to this architecture. In other examples, router 80 may be configured in a variety of ways. In one example, some of the functionally of control unit 82 may be distributed within IFCs 112. Control unit 82 may be implemented solely in software, or hardware, or may be implemented as a combination of software, hardware, or firmware. For example, control unit 82 may comprise one or more of a processor, a programmable processor, a general purpose processor, processing circuitry, an integrated circuit, an Application Specific Integrated Circuit (ASIC), a Field Programmable Gate Array (FPGA), or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 4:
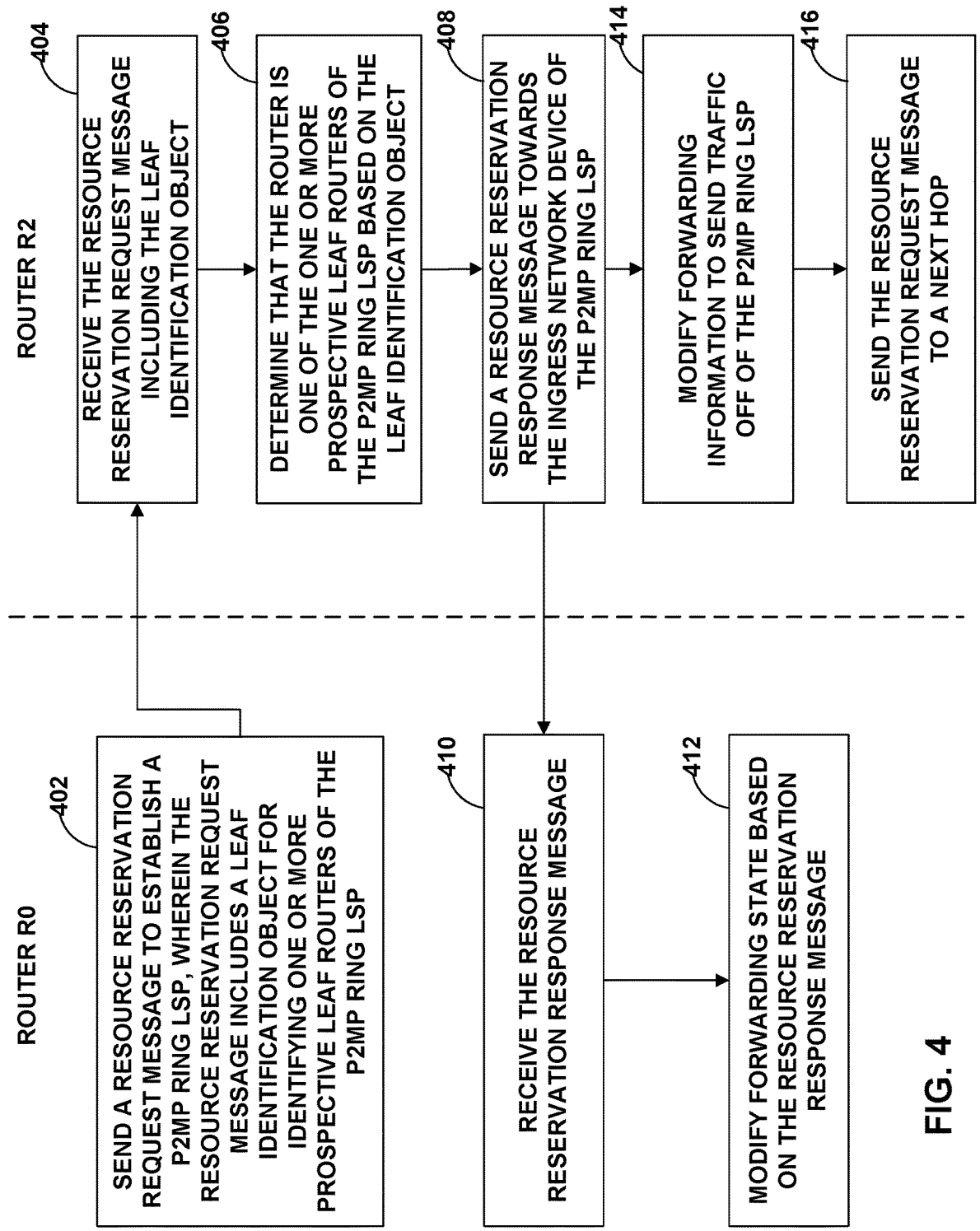
FIG. 4 is a flowchart illustrating example operation of network devices in accordance with aspects of the techniques described herein.

FIG. 4 is a flowchart illustrating example operation of a network device, such as a router, in accordance with aspects of the techniques described herein. Although FIG. 4 is described for purposes of example with respect to routers R0, R2, R4 and R7 of FIGS. 1 and 2, and router 80 of FIG. 3, the flowchart is applicable to any router in a ring network.

Ingress router R0 may send a resource reservation request message including a leaf identification object to establish a P2MP ring LSP (402). In some examples, ingress router R0, via leaf signaling unit 120, may send a resource reservation request message including a leaf identification object that explicitly identifies one or more network addresses of prospective leaf routers of the P2MP ring LSP. In one instance, the leaf signaling unit 120 of ingress router R0 may include an S2L Sub-LSP Descriptor List in accordance with RSVP-TE 95 that includes one or more network addresses of prospective leaf routers of the P2MP ring LSP. Alternatively, or additionally, ingress router R0, via leaf signaling unit 120, may send a S2L Sub-LSP Descriptor List that includes a network address of ingress router R0 such that routers of ring network 20 may implicitly determine whether the router is to be a leaf network device of the P2MP ring LSP 24. In examples where the leaf identification object includes one or more network addresses of prospective leaf routers and the network address of ingress router R0, the network address of ingress router R0 may be encoded as the last network address of the leaf identification object.

In this example, ingress router R0 sends the resource reservation request message without an ERO or SERO. The resource reservation request message may include a ring identifier (ring ID) identifying a P2MP ring LSP and a direction flag indicating a direction of clockwise or counterclockwise of the resource reservation request message.

Router R2 may receive the resource reservation request message including the leaf identification object (404). In response to receiving the resource reservation request message, router R2 may determine, e.g., based on the ring ID, the direction and/or the leaf identification object, that the resource reservation request message is to be analyzed in accordance with the techniques described in this disclosure. For example, router R2 may determine, based on the leaf identification object included in the resource reservation request message, that router R2 is a prospective leaf router of the P2MP ring LSP (406). For example, router R2, via a leaf signaling unit 120, may determine that the network address of router R2 is included in the leaf identification object. Alternatively, or additionally, router R2 may determine that the network address of the ingress router of the P2MP ring LSP is included in the leaf identification object. In this example (e.g., where the network address of router R2 is not included in the leaf identification object, but the network address of the ingress router is included in the leaf identification object), the leaf signaling unit 120 of router R2 may perform a lookup of configuration information of router R2 that is stored in leaf status information 122. In this example, the configuration information indicates whether router R2 is to be a leaf router of the P2MP ring LSP.

In response to determining that router R2 is a prospective leaf router of the P2MP ring LSP, router R2 sends a resource reservation response message to a previous hop of the ring network to indicate that a portion of the P2MP ring LSP has been established and requested resources have been reserved as requested from ingress router R0 to router R2 (408). For example, router R2 sends the resource reservation response message without an RRO or SRRO. Ingress router R0 may receive the resource reservation response message from router R2 (410). In response, ingress router R0 receives the resource reservation response message from router R2 and modifies its forwarding information to forward traffic along the P2MP ring LSP to leaf router R2 (412).

Router R2 may modify its forwarding information state based on the resource reservation request message to send traffic off of the P2MP ring LSP (e.g., to a network device outside of the ring network that is reachable through router R2 (e.g., customer network 13B)) (414). Router R2 may send the resource reservation request message to a next hop of the P2MP ring LSP (416). As further described below in FIG. 5, router R2 may send a modified resource reservation request message in response to determining it is listed in the leaf identification object. Alternatively, or additionally, router R2 may send the same resource reservation request message that was received (in step 404) in response to determining that the network address of ingress router R0 is listed in the leaf identification object.

Depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 5:
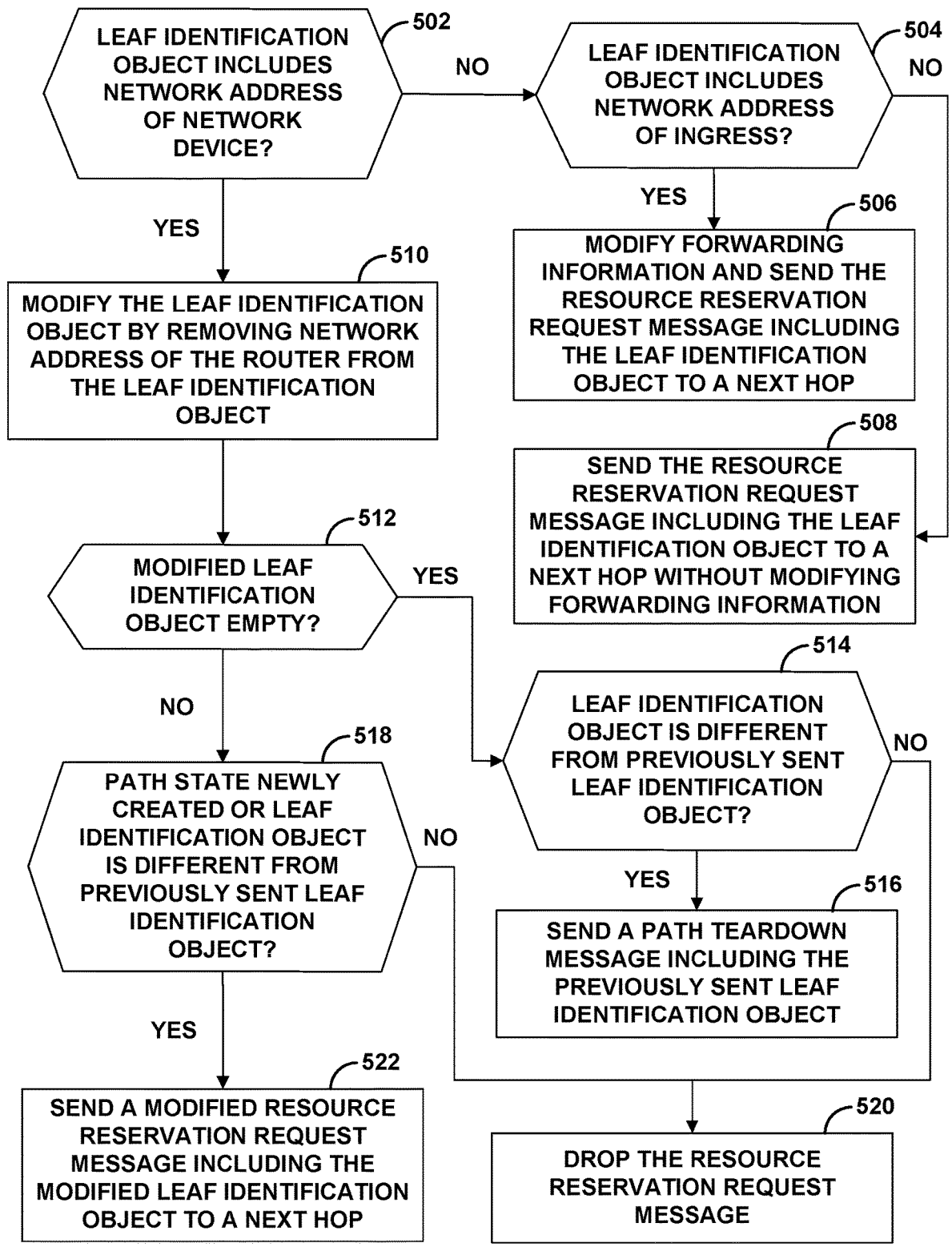
FIG. 5 is a flowchart illustrating the example operation of network devices in further detail, in accordance with aspects of the techniques described herein.

FIG. 5 is a flowchart illustrating the example operation of network devices in further detail, in accordance with aspects of the techniques described herein. FIG. 5 is described with respect to router R2 of FIG. 4. Although FIG. 5 is described with respect to router R2, the flowchart is applicable to any router in a ring network.

In the example of FIG. 5, router R2 may send the resource reservation request message based on certain criteria. For example, router R2 may determine whether the leaf identification object includes a network address of router R2 (502). For example, router R2 may determine, based on the S2L Sub-LSP Descriptor List, whether a network address of router R2 is explicitly listed in the Sub-LSP Descriptor List.

If router R2 determines that the leaf identification object does not include the network address of router R2 ("NO" branch of 502), router R2 may determine whether the leaf identification object includes a network address of the ingress router of the P2MP ring LSP (504). In some examples where the leaf identification object includes both a network address of a network device of the P2MP ring LSP and a network address of the ingress router of the P2MP ring LSP, router R2 may determine whether the network address of the ingress router R0 is encoded as the last element of the leaf identification object. If router R2 determines that the network address of the ingress router R0 is encoded as the last element of the leaf identification object ("YES" branch of 504), router R2 may modify its forwarding information to forward network traffic received on the P2MP ring LSP to a network device outside the ring network and reachable via router R2 and send the resource reservation request message including the leaf identification object to a next hop network device of the P2MP ring LSP (506). If router R2 determines that the network address of the ingress router R0 is not encoded as the last element of the leaf identification object ("NO" branch of 504), router R2, as a non-leaf router, may forward the resource reservation request message to a next hop network device of the P2MP ring LSP without making any updates to the forwarding information (508).

If the leaf identification includes a network address of the router, ("YES" branch of 502), router R2 modifies the leaf identification object by removing the network address of router R2 from the leaf identification object to generate a modified leaf identification object (510). In response to modifying the leaf identification object, router R2 may determine whether the modified leaf identification object is empty (512). If the modified leaf identification object is empty ("YES" branch of 512), router R2 may further determine whether the leaf identification object is different from a previously received leaf identification object (514). For example, assume router R2 received a first leaf identification object from a prior resource reservation request message to establish a P2MP ring LSP. Router R2 may subsequently receive a second resource reservation request message including a second leaf identification object requesting to establish a new P2MP ring LSP. Router R2 may determine whether the one or more network addresses included in the first leaf identification object is different than the one or more network addresses included in the second leaf identification object.

If the leaf identification object is different from the previously received leaf identification object ("YES" branch of 514), router R2 sends a path teardown message, including the previously received leaf identification object (516). In this instance, router R2 may determine that the current resource reservation request message includes a leaf identification object that identifies leaf routers that different than the leaf routers that were identified in a prior signaling. If the leaf identification object is not different from the previously received leaf identification object ("NO" branch of 514), router R2 does not forward, e.g., drops, the resource reservation request message (520), because the current list of leaf routers has not changed.

If the modified leaf identification object is not empty ("NO" branch of 512), router R2 may further determine whether: (1) the path state is newly created, or (2) the leaf identification object is different from a previously sent leaf identification object (518). For example, if the path state is newly created or if the leaf identification object is different from the previously received leaf identification object ("YES" branch of 518"), router R2 sends a modified resource reservation request message including the modified leaf identification object to a next hop (522). Alternatively, if the path state is not newly created and if the leaf identification object is different from the previously received leaf identification object ("NO" branch of 518), router R2 does not forward, e.g., drops, the resource reservation request message (520).

Although FIG. 5 is described with respect to a router that may determine, whether explicitly or implicitly, that a prospective leaf router of the P2MP ring LSP, the routers in the ring network may in some examples only support techniques for explicitly determining whether the routers are prospective leaf routers of the P2MP ring LSP. In these examples, router R2 may perform only steps 502, 510-520, and step 508 if "NO" branch of step 502 (connection not shown). In some examples, the routers may only support techniques for implicitly determining whether the routers are prospective leaf routers of the P2MP ring LSP. In these examples, router R2 may perform only steps 504-508.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other medium that can be used to store desired program code in the form of instructions or data structures and that can be accessed by a computer. The term "computer-readable storage media" refers to non-transitory, tangible storage media, and not connections, carrier waves, signals, or other transitory media.

Various examples have been described. These and other examples are within the scope of the following claims.

What is claimed is:

1. A method comprising:

receiving, by a network device and from an ingress network device of a ring network, a resource reservation request message to establish a point-to-multipoint (P2MP) ring label switched path (LSP), wherein the resource reservation request message includes a leaf identification object that identifies a plurality of leaf network devices of the P2MP ring LSP;

determining, by the network device and based on the leaf identification object, that the network device is one of the plurality of leaf network devices of the P2MP ring LSP;

sending, by the network device and in response to determining that the network device is one of the plurality of leaf network devices of the P2MP ring LSP and reserving resources according to the resource reservation request message, a resource reservation response message towards the ingress network device;

modifying, by the network device and based on the resource reservation request message, forwarding information of the network device to forward network traffic received on the P2MP ring LSP off of the P2MP ring LSP; and sending, by the network device and to a next hop network device along the P2MP ring LSP, the resource reservation request message.

2. The method of claim 1, further comprising:

determining, by the network device, that the resource reservation request message comprises a ring identifier identifying P2MP ring LSP and a direction flag indicated a direction of clockwise or counterclockwise.

3. The method of claim 1, wherein receiving the resource reservation request message to establish the P2MP ring LSP comprises:
receiving a resource reservation request message that does not specify an Explicit Route Object (ERO) or a Secondary Explicit Route Object (SERO).

4. The method of claim 1, wherein sending the resource reservation request message comprises:
sending a resource reservation request message that does not specify an Explicit Route Object (ERO) or a Secondary Explicit Route Object (SERO).

5. The method of claim 1, wherein determining that the network device is one of the plurality of leaf network devices of the P2MP ring LSP comprises:
determining that the leaf identification object includes a network address of the network device.

6. The method of claim 1, wherein determining that the network device is one of the plurality of leaf network devices of the P2MP ring LSP comprises:
determining, in response to determining that the leaf identification object includes a network address of an ingress network device of the P2MP ring LSP, whether the network device is one of the plurality of leaf network devices of the P2MP ring LSP.

7. The method of claim 1, wherein sending the resource reservation request message comprises:
modifying, by the network device and in response to determining that the leaf identification object includes a network address of the network device, the leaf identification object by removing the network address of the network device from the leaf identification object to generate a modified leaf identification object; and
sending, by the network device and in response to determining that the modified leaf identification object is not empty and that a path state of the network device for the P2MP ring LSP is newly created, a modified resource reservation request message including the modified leaf identification object to the next hop.

8. The method of claim 1, wherein sending the resource reservation request message comprises:
modifying, by the network device and in response to determining that the leaf identification object includes a network address of the network device, the leaf identification object by removing the network address of the network device from the leaf identification object to generate a modified leaf identification object; and
sending, by the network device and in response to determining that the modified leaf identification object is not empty and that the leaf identification object is different from a previously sent leaf identification object, a modified resource reservation message including the modified leaf identification object to the next hop.

9. The method of claim 1, wherein sending the resource reservation request message comprises:
sending, by the network device and in response to determining that the leaf identification object includes a network address of the ingress network device of the P2MP ring LSP, the resource reservation request message including the leaf identification object to the next hop.

10. The method of claim 1, further comprising:
modifying, by the network device and in response to determining that the leaf identification object includes a network address of the network device, the leaf identification object by removing the network address of the network device from the leaf identification object to generate a modified leaf identification object; and
sending, by the network device and in response to determining that the modified leaf identification object is empty and the leaf identification object is different from a previously received leaf identification object, a path teardown message including the previously received leaf identification object.

11. The method of claim 1, further comprising:
sending, by the network device and in response to determining that the network device is no longer one of the plurality of leaf network devices of the P2MP ring LSP, a Resource Reservation Protocol (RSVP) reservation teardown message to a previous hop of the P2MP ring LSP.

12. The method of claim 11, wherein sending the RSVP reservation teardown message to the previous hop of the P2MP ring LSP comprises:
determining, by the network device, that the network device did not receive a resource reservation response message from the next hop network device along the P2MP ring LSP.

13. The method of claim 1,
wherein the resource reservation request message comprises a Resource Reservation Protocol (RSVP) path message,
wherein the resource reservation response message comprises an RSVP reservation message, and
wherein the leaf identification object comprises a S2L Sub-LSP Descriptor List object.

14. The method of claim 1, further comprising:
receiving, by the network device and from the next hop network device along the P2MP ring LSP, a resource reservation response message;
determining, by the network device, that the resource reservation response message is received from the next hop network device along the P2MP ring LSP for the resource reservation request message that was sent to the next hop network device along the P2MP ring LSP;
modifying, by the network device and based on the resource reservation response message, forwarding information of the network device to forward network traffic received on the P2MP ring LSP to the next hop network device along the P2MP ring LSP; and
sending, by the network device and to a previous hop network device along the P2MP ring LSP, the resource reservation response message.

15. A network device comprising:
a plurality of physical interfaces for receiving traffic from two or more network devices of a plurality of network devices in a ring network;
one or more processors configured to:
receive, from an ingress network device of the ring network, a resource reservation request message to establish a point-to-multipoint (P2MP) ring label switched path (LSP), wherein the resource reservation request message includes a leaf identification object that identifies a plurality of leaf network devices of the P2MP ring LSP;
determine, based on the leaf identification object, that the network device is one of the plurality of leaf network devices of the P2MP ring LSP;
send, in response to determining that the network device is one of the plurality of leaf network devices of the P2MP ring LSP and reserving resources according to the resource reservation request message, a resource reservation response message for the resource reservation request message towards the ingress network device;

modify, based on the resource reservation request message, forwarding information of the network device to forward network traffic received on the P2MP ring LSP off of the P2MP ring LSP; and send the resource reservation request message to a next hop network device along the P2MP ring LSP.

16. The network device of claim 15, wherein the one or more processors is further configured to:

determine that the resource reservation request message comprises a ring identifier identifying P2MP ring LSP and a direction flag indicated a direction of clockwise or counterclockwise.

17. The network device of claim 15, wherein the resource reservation request message does not include an Explicit Route Object (ERO) or a Secondary Explicit Route Object (SERO).

18. The network device of claim 15, wherein the leaf identification object includes a network address of the network device.

19. The network device of claim 15, wherein, to determine that the network device is one of the plurality of leaf network devices of the P2MP ring LSP, the one or more processors is further configured to determine, in response to determining that the leaf identification object includes a network address of an ingress network device of the P2MP ring LSP, whether the network device is one of the plurality of leaf network devices of the P2MP ring LSP.

20. The network device of claim 15, wherein to send the resource reservation request message, the one or more processors is further configured to:

modify, in response to determining that the leaf identification object includes a network address of the network device, the leaf identification object by removing the network address of the network device from the leaf identification object to generate a modified leaf identification object; and send, in response to determining that the modified leaf identification object is not empty and that a path state of the network device for the P2MP ring LSP is newly created, a modified resource reservation request message including the modified leaf identification object to the next hop.

21. The network device of claim 15, wherein, to send the resource reservation request message, the one or more processors is further configured to:

modify, in response to determining that the leaf identification object includes a network address of the network device, the leaf identification object by removing the network address of the network device from the leaf identification object to generate a modified leaf identification object; and send, in response to determining that the modified leaf identification object is not empty and that the leaf identification object is different from a previously sent leaf identification object, a modified resource reservation message including the modified leaf identification object to the next hop.

22. The network device of claim 15, wherein to send the resource reservation request message, the one or more processors is further configured to:

send, in response to determining that the leaf identification object includes a network address of the ingress network device of the P2MP ring LSP, the resource reservation request message including the leaf identification object to the next hop.

23. The network device of claim 15, wherein the one or more processors is configured to:

modify in response to determining that the leaf identification object includes a network address of the network device, the leaf identification object by removing the network address of the network device from the leaf identification object to generate a modified leaf identification object; and send, in response to determining that the modified leaf identification object is empty and the leaf identification object is different from a previously received leaf identification object, a path teardown message including the modified leaf identification object.

24. The network device of claim 15, the one or more processors further configured to:

send, in response to determining that the network device is no longer one of the plurality of leaf network devices of the P2MP ring LSP, a Resource Reservation Protocol (RSVP) reservation teardown message to a previous hop of the P2MP ring LSP.

25. The network device of claim 15, wherein the resource reservation request message comprises a Resource Reservation Protocol (RSVP) path message, wherein the resource reservation response message comprises an RSVP reservation message, and wherein the leaf identification object comprises a S2L Sub-LSP Descriptor List object.

26. A non-transitory computer-readable storage medium of a network device storing instructions that cause a processor to:

receive, from an ingress network device of the ring network, a resource reservation request message to establish a point-to-multipoint (P2MP) ring label switched path (LSP), wherein the resource reservation request message includes a leaf identification object that identifies plurality of leaf network devices of the P2MP ring LSP;

determine, based on the leaf identification object, that the network device is one of the plurality of leaf network devices of the P2MP ring LSP;

send, in response to determining that the network device is plurality of leaf network devices of the P2MP ring LSP and reserving resources according to the resource reservation request message, a resource reservation response message for the resource reservation request message towards the ingress network device;

modify, based on the resource reservation request message, forwarding information of the network device to forward network traffic received on the P2MP ring LSP off of the P2MP ring LSP; and send the resource reservation request message to a next hop network device along the P2MP ring LSP.

* * * * *